(No Model.)
C. W. MILLER.
DRIVE CHAIN.
No. 339,003.   Patented Mar. 30, 1886.
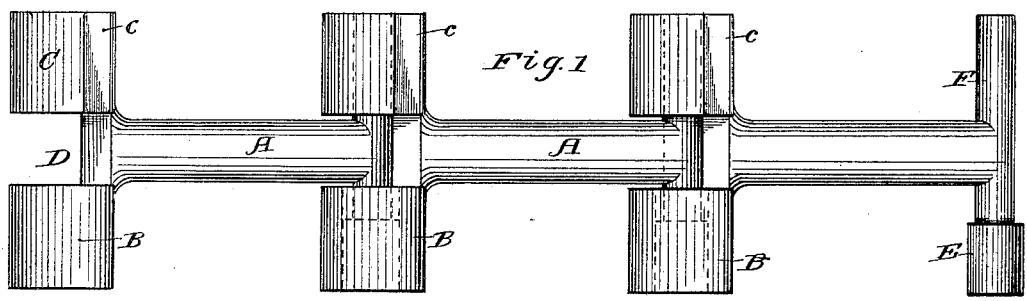
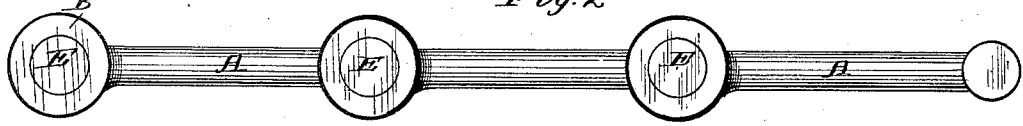
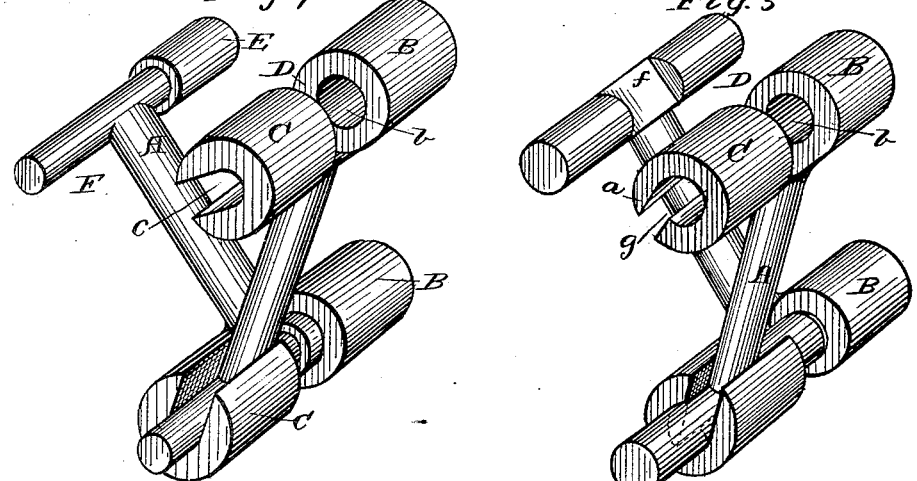
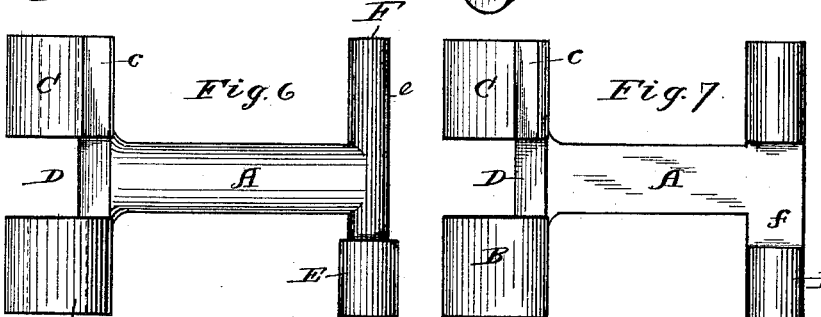
Witnesses:
J. C. Turner
J. S. Barker
Inventor:
Charles W. Miller
by Doubleday & Bliss attys.

UNITED STATES PATENT OFFICE.

CHARLES W. MILLER, OF COLUMBUS, OHIO, ASSIGNOR OF ONE-HALF TO JOSEPH ANDREW JEFFREY, OF SAME PLACE.

DRIVE-CHAIN.

SPECIFICATION forming part of Letters Patent No. 339,003, dated March 30, 1886.

Application filed September 19, 1884. Serial No. 143,484. (No model.)

*To all whom it may concern:*

Be it known that I, CHARLES W. MILLER, a citizen of the United States, residing at Columbus, in the county of Franklin and State of Ohio, have invented certain new and useful Improvements in Drive-Chains, of which the following is a specification, reference being had therein to the accompanying drawings.

Figure 1 is a plan view of my improved chain. Fig. 2 is an edge view. Fig. 3 is an edge view of the opposite side of the chain. Fig. 4 is a perspective view showing two links of one of the forms, illustrating the position of the links for uncoupling. Fig. 5 is a similar view showing two links of modified form in position for uncoupling. Figs. 6 and 7 are detached views of the different links.

Similar letters of reference indicate like parts in all the figures.

Referring to Figs. 1, 2, 3, 4, and 6, A is a bar expanded at one end, as at B C. The part B consists of a closed eye or loop substantially circular in cross-section, and having a circular seat, $b$, extending through it on a line at right angles to the bar A. The part C is in the form of a hook having a circular seat, $c$, and a throat, $d$, the width of the throat being equal to or greater than the diameter of the circular seat. Between the parts B and C there is an open space or throat, D, preferably of a width about equal to the width of the bar A. The seat $b$ is of a much greater diameter than the seat $c$ in the hook.

As indicated in the drawings, the diameter of the seat $b$ is about twice that of the seat $c$.

At the opposite end the bar A is expanded and formed into a transverse bar, E F. This bar is circular in cross-section, the part E being of a diameter to fit closely the seat $b$ in the closed eye B. As will be readily seen by reference to Fig. 4, these links can be coupled together and formed into a chain by placing them at about the angle to each other there shown, then passing the part F, which is of a diameter equal to the thickness of the bar A, through the throat $d$ of the hook.

The width of the throat D is about equal to the diameter of the part F of the bar, and after the links are placed in the position shown in Fig. 4 the part F can be thrust into the seat $b$ by an endwise movement, after which the links can be straightened out, as in Figs. 1, 2, 3.

I am aware that a chain has been composed of links, each having a bar like that shown at A, with cross-bars or T-pieces, both of equal diameter at one end of the bar, and hooks with open throats extending across their entire widths at the opposite end of the bar, the throats of the hooks being of a width less than the diameter of the transverse bars, so that in order to connect two links with each other it was necessary to place one end of the transverse bars or cross-bar opposite to the seat of one of the hooks and then couple them by a sidewise movement equal in distance to the entire length of both transverse bars, passing the longitudinal bar into and through the hook of the throat on a line at right angles to the longitudinal bar; but my links cannot be coupled together or uncoupled from each other by such movement, from the fact that it is impossible to pass the part F through either the seat $c$ or the throat $d$ of the hook.

My links possess some advantages over any others of this general character of which I am aware. For instance, they can be uncoupled with a less amount of sidewise movement relative to each other, from the fact that the end bar, E, is of a diameter equal to the thickness of the longitudinal bar A, and hence it is only necessary to move one link laterally relative to an adjacent link far enough to withdraw the part F from its seat $b$ and into the throat D, as indicated in Fig. 4. This feature of operation is very desirable with short chains in which the articulating parts fit each other closely. Again, it is well known that the articulating parts of these chains wear quite rapidly under some circumstances, particularly when the chains are under heavy tension.

Now, the use of the closed eye B $b$ enables me to use the part F of at least twice the diameter in cross-section of the part E, and thus materially increase the strength and durability of the chain without an increase in the weight of metal.

In Figs. 5 and 7 I have shown a modification, in which the seat $g$ of the hook is of much greater diameter than its throat $a$, and to permit the coupling and uncoupling of the chain with the links in the same relative position to each other I cut down or slab off a part of the cross-bar, as at $f$, sufficient to permit it to pass through the throat of the hook.

Although the part $e$ of the link which is shown detached in Fig. 6 is round in cross-section, yet its diameter is about equal to the thickness of the part marked $f$ in Fig. 7; and this reduction in size at $e$ enables such links to be uncoupled in the same manner as the other form (shown detached in Fig. 7) can be, and some of the same advantages can be thereby attained—to wit, the uncoupling of the links with but a slight lateral movement of one link relative to the adjacent one.

I am aware of Patents Nos. 180,907 and 234,548, and do not claim anything shown or described therein; but my invention differs radically from the construction shown in either of those patents. For instance, it is indispensable in my chain that the hook should have a throat extending its entire width, so that one end of the T-piece can be passed bodily through such throat, and wherever in my specification the word "hook" is used I mean a hook of such character; but, on the other hand, neither of the chains shown or described in the above-mentioned earlier patents has any hooks whatever; but, on the contrary, each link has at one end a T-piece, and at its opposite end two socket-like devices, both of which are exactly alike in form, so that to describe one of such sockets as being a closed eye and its adjacent socket as a hook would be unwarranted by the construction.

I do not claim herein any inventions other than those which are specifically pointed out and recited in the claims, reserving to myself the right to claim all other patentable features which are shown or described in another application, No. 124,988, filed by me March 17, 1884.

What I claim is—

1. A drive-chain link having the longitudinal bar provided at one end with a centrally-attached transverse bar, the ends of which are of different diameters, and at its opposite end with an open hook having a throat as wide as the diameter of the smaller end of the transverse bar, and with a closed eye adapted to receive and retain the larger end of the said bar, substantially as set forth.

2. A drive-chain link having the longitudinal bar provided at one end with a centrally-attached transverse bar and at its opposite end with an open hook adapted to receive one end of the transverse bar, and with a closed eye adapted to receive the other end of the transverse bar, a portion of the said bar adjacent to the end of the longitudinal bar being smaller than an adjacent portion of the said bar and of such size as to pass through the throat of the open hook when the links are placed at an angle to each other, substantially as set forth.

In testimony whereof I affix my signature in presence of two witnesses.

CHARLES W. MILLER.

Witnesses:
D. C. WELLING,
SAMUEL I. PARKINSON.